B. F. FIELD.

Manufacture of Paper Boards.

No. 6,502. Reissued June 22, 1875.

Witnesses;
Harry C. Clark.
M. Church

Inventor.
Benjamin F. Field
By Asher Ellsworth
His Attys.

UNITED STATES PATENT OFFICE.

BENJAMIN F. FIELD, OF BELOIT, WISCONSIN.

IMPROVEMENT IN THE MANUFACTURE OF PAPER-BOARDS.

Specification forming part of Letters Patent No. 105,790, dated July 26, 1870; reissue No. 6,502, dated June 22, 1875; application filed July 10, 1874.

*To all whom it may concern:*

Be it known that I, BENJAMIN F. FIELD, of Beloit, in the county of Rock and State of Wisconsin, have invented a new and useful Improvement in the Manufacture of Paper-Board for Paper-Box Makers and other purposes; and I do hereby declare the following to be a full, clear, and exact description of the same, reference being had to the accompanying drawings, in which—

Figure 1:
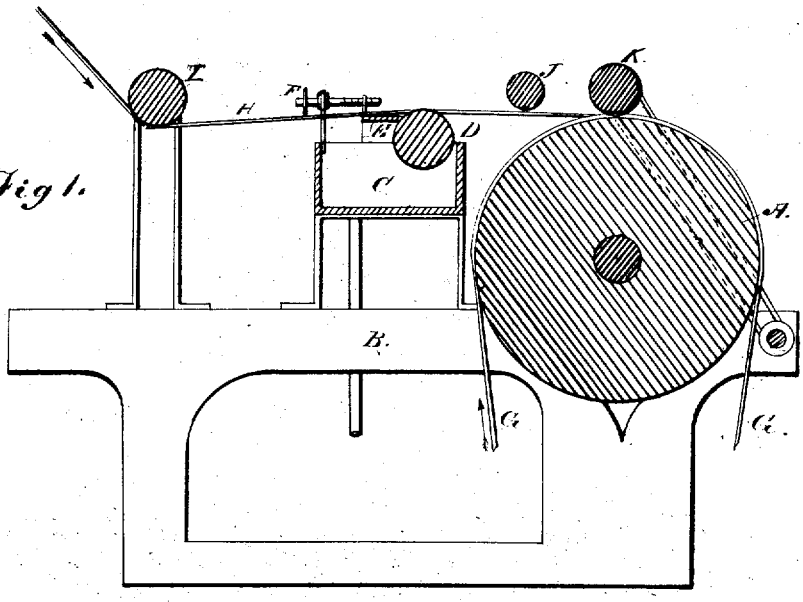
Figure 3:
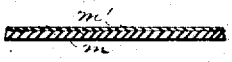
Figure 2:
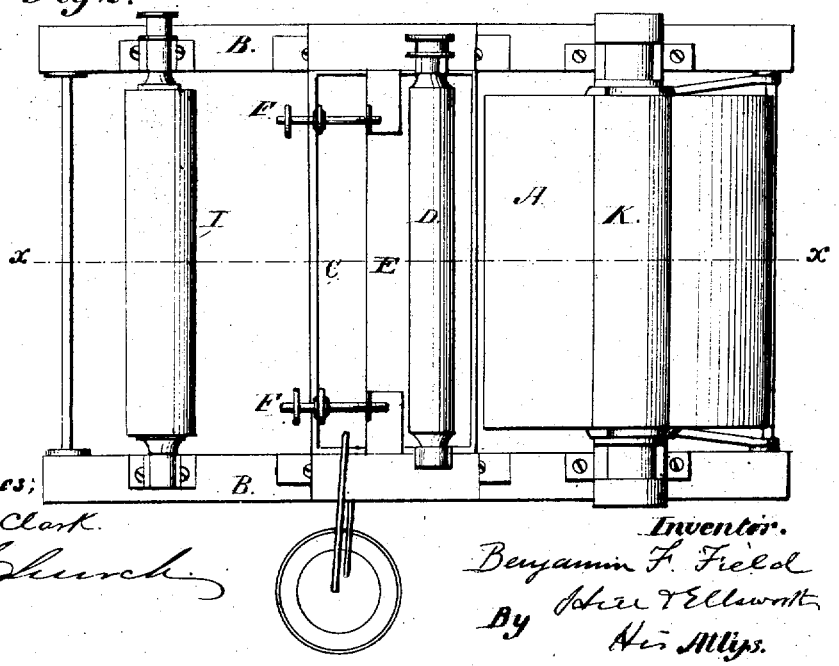

Figure 1 is a vertical longitudinal section of that portion of my machine described in this patent, taken on line *x x*, Fig. 2. Fig. 2 is a plan view of the above, and Fig. 3 is a section of a piece of straw-board lined as hereinafter described.

Similar letters of reference in the accompanying drawings denote the same parts.

Heretofore, in the manufacture and subsequent preparation of paper and board, it has been the general practice to build up pasteboard of the required thickness and weight by running together different webs of wet or only partially-dried pulp, and compressing them into one sheet. In thus building up the board, one of the outside webs has been colored for the purpose of giving the board a colored facing, and a thin web of fine quality has been prepared and partially dried on one machine, and then taken to another, and attached by pressure alone, without paste, to a thicker web of coarser quality in process of manufacture thereon. It has also been common to take several sheets of finished thin paper after they have left the machine upon which they were manufactured, and paste them together by means of suitable pasting and pressing machinery, so as to form thick sheets of pasteboard faced with any required tint; and the process of facing the ordinary sheets of straw-board, twenty-six by thirty-eight inches in size, with thin paper, either by hand or by machinery, has long been known and commonly practiced.

My invention does not relate to any of these old processes or modes of manufacturing or lining board, but consists in combining with the machine that makes the thick board in continuous lengths an apparatus for pasting and pressing upon such board while it is being made a sheet of thin paper previously made.

That others may fully understand the construction and operation of devices suitable to the working of my invention, I will now proceed to describe them. They consist, broadly, in two elements—to wit, the machine that makes the board in continuous lengths, and the machine that pastes the facing-paper and applies it thus pasted to the board during the process of manufacturing the latter.

The former machine is the straw-board or thick-paper machine in common use, and well known to paper-makers, and I have, therefore, in the drawings, shown but a small portion of it—viz., a section of one of the top driers, A, a portion, B, of the upper drier-frame, and a small portion, G, of the web of thick paper in process of manufacture passing over the drier A in the direction of the arrows. All the other parts shown in Figs. 1 and 2 relate to the latter machine—viz., the apparatus or attachment for pasting and applying the thin paper, and may be described as follows:

Said pasting apparatus consists of devices for performing four functions, viz: first, holding and feeding the thin paper; secondly, smoothing and guiding it in its passage to and from the paste-roll; thirdly, applying to it a thin film of paste; and, lastly, pressing it firmly upon the board, so as to cause a perfect adhesion of the two sheets before they leave the driers, and to harden, smooth, and finish the surface of the lined board, after which it is thoroughly dried upon the machine.

The device for holding and feeding the thin paper is not shown in the drawing, but consists of a suitable reel located at some convenient point, so that the paper can be fed from it properly to the paste-roll.

The smoothing and guiding device consists in the employment of suitable rolls, in contact with which the thin paper is passed before or after, or before and after, its contact with the paste-roll, to keep it from wrinkling. These rolls, as represented in the drawings, are shown at I J, the former holding the paper smooth and guiding it to the paste-roll constantly in the same direction, so that an equal extent of paste-roll surface is always in contact with the lining-paper, and the amount of paste applied is therefore uniform at all times under any particular adjustment of the machine.

The device for applying and regulating the paste is shown at C D E. The essential features of this device are, a paste-reservoir, a roll to dip in the paste and transfer a portion thereof continuously to the lining-paper, and means for regulating the quantity of paste so transferred, rendering it uniform across the whole width of the sheet, and preventing lumps from passing to the sheet. The paste-reservoir is shown at C, and a roll for transferring the paste from the reservoir to the paper is to be seen at D, said roll not depending for its rotation upon the movement of the lining-paper, which, being wet with paste, would be liable to break in turning so large a roll, and which would also slip in the paste without turning the roll, but being driven by a suitable belt or other means by power derived from some part of the paper-machine.

The principle upon which I regulate and equalize the amount of paste transferred to the paper is by arranging parallel to the paste-roll a straight surface or edge, which, being adjusted at a greater or less distance from the paste-roll, or in contact with it at a greater or less pressure, will allow only a limited quantity of paste to pass through the space between it and the paste-roll, such quantity being in exact proportion to the distance of the two surfaces from each other, and being adjustable with such distance. This surface or edge parallel to the paste-roll not only prevents too much paste from being applied to the paper, but has a tendency to scrape or press back the paste, and thus distribute it more uniformly over the surface that applies it to the paper, and likewise serves to prevent lumps of hardened or imperfectly-prepared paste from passing to the paper and damaging the lining-surface.

As shown herein, I have for the adjustable surface referred to made use of a slide, E, controlled and regulated by screws F F.

The device for pressing the thin paper upon the thick board, so as to secure a perfect adhesion of the two prior to the drying of the paste, and so as at the same time to harden and compact the lined board, and smooth and finish its surface, consists of a roller, K, which rides upon the two sheets, and unites them firmly together. This press-roll is preferably arranged to operate in connection with the first drier that the thin paper comes to after leaving the paste-roll. All the rollers may be driven by belts or other sufficient means, so as to relieve the webs from undue strain. The drier A and press-roll K will serve to draw the lining-paper from the reel.

Having thus described my invention, I claim as new—

The combination of a machine for making paper-board continuously from pulp with a machine or attachment for applying to such board in the process of its manufacture, and by means of paste and pressure, a sheet of thin lining-paper previously made.

BENJAMIN F. FIELD.

Witnesses:

MELVILLE CHURCH,
W. T. HUTCHINSON.